(12) United States Patent
Yu et al.

(10) Patent No.: US 10,752,121 B2
(45) Date of Patent: Aug. 25, 2020

(54) BATTERY PACK AND VEHICLE COMPRISING THE SAME

(71) Applicant: LG CHEM, LTD., Seoul (KR)

(72) Inventors: Seung-Sik Yu, Daejeon (KR);
Sung-Jong Kim, Daejeon (KR);
Jun-Yeob Seong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 255 days.

(21) Appl. No.: 15/554,080

(22) PCT Filed: Jul. 11, 2016

(86) PCT No.: PCT/KR2016/007526
§ 371 (c)(1),
(2) Date: Aug. 28, 2017

(87) PCT Pub. No.: WO2017/014473
PCT Pub. Date: Jan. 26, 2017

(65) Prior Publication Data
US 2018/0034012 A1    Feb. 1, 2018

(30) Foreign Application Priority Data

Jul. 20, 2015    (KR) ........................ 10-2015-0102610

(51) Int. Cl.
*H01M 2/10* (2006.01)
*H01M 2/04* (2006.01)
(Continued)

(52) U.S. Cl.
CPC ........... *B60L 50/60* (2019.02); *H01M 2/0439* (2013.01); *H01M 2/06* (2013.01); *H01M 2/08* (2013.01);
(Continued)

(58) Field of Classification Search
None
See application file for complete search history.

(56) References Cited

U.S. PATENT DOCUMENTS

| 9,023,498 B2 | 5/2015 | Kim et al. | |
| 2007/0122696 A1* | 5/2007 | Richter | H01M 2/06 |
| | | | 429/176 |

(Continued)

FOREIGN PATENT DOCUMENTS

| CN | 202917549 U | 5/2013 |
| EP | 2 518 792 A1 | 10/2012 |

(Continued)

OTHER PUBLICATIONS

International Search Report for PCT/KR2016/007526 (PCT/ISA/210) dated Oct. 21, 2016.

*Primary Examiner* — Robert Grant
*Assistant Examiner* — Tynese V McDaniel
(74) *Attorney, Agent, or Firm* — Birch, Stewart, Kolasch & Birch, LLP

(57) ABSTRACT

Provided is a battery pack including a pack case configured to form an exterior; a cell assembly accommodated in the pack case, and including a plurality of battery cells respectively including electrode leads; a pack cover configured to cover the pack case so as to package the cell assembly; and a lead connecting substrate provided between the cell assembly and the pack cover, configured to connect the electrode leads of the plurality of battery cells to one another, and including insert-molded terminals penetrating through the pack cover to be connected to an external power supply.

8 Claims, 3 Drawing Sheets

(51) Int. Cl.
  *H01M 2/30*   (2006.01)
  *H01M 2/06*   (2006.01)
  *B60L 50/50*  (2019.01)
  *H01M 2/08*   (2006.01)
  *H01M 2/20*   (2006.01)
  *H01M 2/32*   (2006.01)
  *H01M 10/42*  (2006.01)
  *H01M 2/36*   (2006.01)
  *B60L 50/60*  (2019.01)

(52) U.S. Cl.
  CPC ........... *H01M 2/10* (2013.01); *H01M 2/1077* (2013.01); *H01M 2/1083* (2013.01); *H01M 2/206* (2013.01); *H01M 2/30* (2013.01); *H01M 2/305* (2013.01); *H01M 2/32* (2013.01); *H01M 10/425* (2013.01); *H01M 2/365* (2013.01); *H01M 2220/20* (2013.01); *Y02T 10/7016* (2013.01)

(56) References Cited

U.S. PATENT DOCUMENTS

| | | | |
|---|---|---|---|
| 2012/0301747 A1 | 11/2012 | Han et al. | |
| 2012/0321943 A1* | 12/2012 | Ito | H01M 2/06 429/179 |
| 2014/0147721 A1 | 5/2014 | Kurahashi | |
| 2015/0364732 A1* | 12/2015 | Kim | H01M 2/08 429/179 |
| 2016/0064722 A1* | 3/2016 | Mack | H01M 2/1072 429/151 |

FOREIGN PATENT DOCUMENTS

| | | |
|---|---|---|
| EP | 3 010 072 A1 | 4/2016 |
| JP | 3-134956 A | 6/1991 |
| JP | 2004-265830 A | 9/2004 |
| JP | 5213030 B2 | 6/2013 |
| KR | 10-2013-0006280 A | 1/2013 |
| KR | 10-1347194 B1 | 1/2014 |

* cited by examiner

BATTERY PACK AND VEHICLE COMPRISING THE SAME

TECHNICAL FIELD

The present disclosure relates to a battery pack and a vehicle including the battery pack.

The present application claims priority to Korean Patent Application No. 10-2015-0102610 filed on Jul. 20, 2015 in the Republic of Korea, the disclosure of which is incorporated herein by reference.

BACKGROUND ART

Nickel cadmium batteries, nickel hydrogen batteries, nickel zinc batteries, lithium secondary batteries, etc. are currently commercialized, and the lithium secondary batteries among those batteries are highlighted due to such advantages as free charging/discharging because a memory effect rarely occurs in the lithium secondary batteries when being compared with nickel-based secondary batteries, very low self-discharging rate, and high energy density.

The lithium secondary battery mainly uses lithium-based oxide and a carbon material respectively as a cathode active material and an anode active material. The lithium secondary battery includes an electrode assembly, in which a cathode plate and an anode plate, on which the cathode active material and the anode active material are respectively applied, are arranged as a separator is disposed between the cathode plate and the anode plate, and an exterior member, in which the electrode assembly is sealed and accommodated with an electrolyte, that is, a battery case.

Recently, secondary batteries have been widely used in a medium and/or large-scale device such as a vehicle and a power storage device, as well as a small device such as a portable electronic device. When a secondary battery is used in a medium and/or large-scale device, the secondary battery is provided as a battery pack, in which a plurality of battery cells that are electrically connected to one another are packaged, in order to increase a capacity and an output.

In the battery pack, a terminal is exposed outside in order to be connected to an external power supply after penetrating through the case. A battery pack according to the related art includes an additional sealing member such as a rubber packing member provided between a terminal and a terminal through unit, in order to prevent external moisture or impurities from being introduced into a case via the terminal through unit that is formed in the case so that the terminal may penetrate.

However, in the battery pack of the related art, in a case where the sealing member is corroded or is not exactly mounted, a gap easily generates and moisture or impurities may easily infiltrate into the case.

Also, the battery pack according to the related art has to include an additional sealing member for a waterproof function, and it increases manufacturing costs.

Thus, it is necessary to search for a method of providing a battery pack capable of achieving a waterproof function without using an additional sealing member.

DISCLOSURE

Technical Problem

The present disclosure is designed to solve the problems of the related art, and therefore the present disclosure is directed to providing a battery pack capable of achieving a waterproof function without using an additional sealing member and a vehicle including the battery pack.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery pack including: a pack case configured to form an exterior; a cell assembly accommodated in the pack case, and including a plurality of battery cells respectively including electrode leads; a pack cover configured to cover the pack case so as to package the cell assembly; and a lead connecting substrate provided between the cell assembly and the pack cover, configured to connect the electrode leads of the plurality of battery cells to one another, and including insert-molded terminals penetrating through the pack cover to be connected to an external power supply.

The pack cover may include terminal through units, through which the terminals penetrate, and the lead connecting substrate may include terminal insert units, in which the terminals are insert-molded, welded with the terminal through units.

Each of the terminal through units may include: a first internal wall having a hollow shape contacting an external surface of each of the terminals; and a second internal wall extending from the first internal wall to be stepped, and configured to contact each of the terminal insert units.

The terminal insert unit may be engaged with the second internal wall.

A width of an outer circumference of the terminal insert unit may be greater than a width of an outer circumference of the terminal.

The terminal through unit and the terminal insert unit may be welded with each other through a laser welding process.

The terminal through units may be respectively provided in a side and other side of the pack cover, and the terminal insert units may be respectively provided in a side and other side of the lead connecting substrate to correspond to the terminal through units.

The lead connecting substrate may further include bus bars configured to electrically connect the electrode leads to the terminals, and the bus bars may be connected to the terminals in the terminal insert units.

The pack cover may be laser-welded to the pack case along with edges.

In another aspect of the present disclosure, there is also provided a vehicle including the battery pack according to above described embodiments.

Advantageous Effects

The present disclosure gives the following effects.

According to various embodiments of the present disclosure, a battery pack capable of achieving a waterproof function without using an additional sealing member and a vehicle including the battery pack may be provided.

Therefore, since an additional sealing member for waterproof is not necessary according to various embodiments of the present disclosure, generation of additional costs may be prevented, and manufacturing efficiency may be improved.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
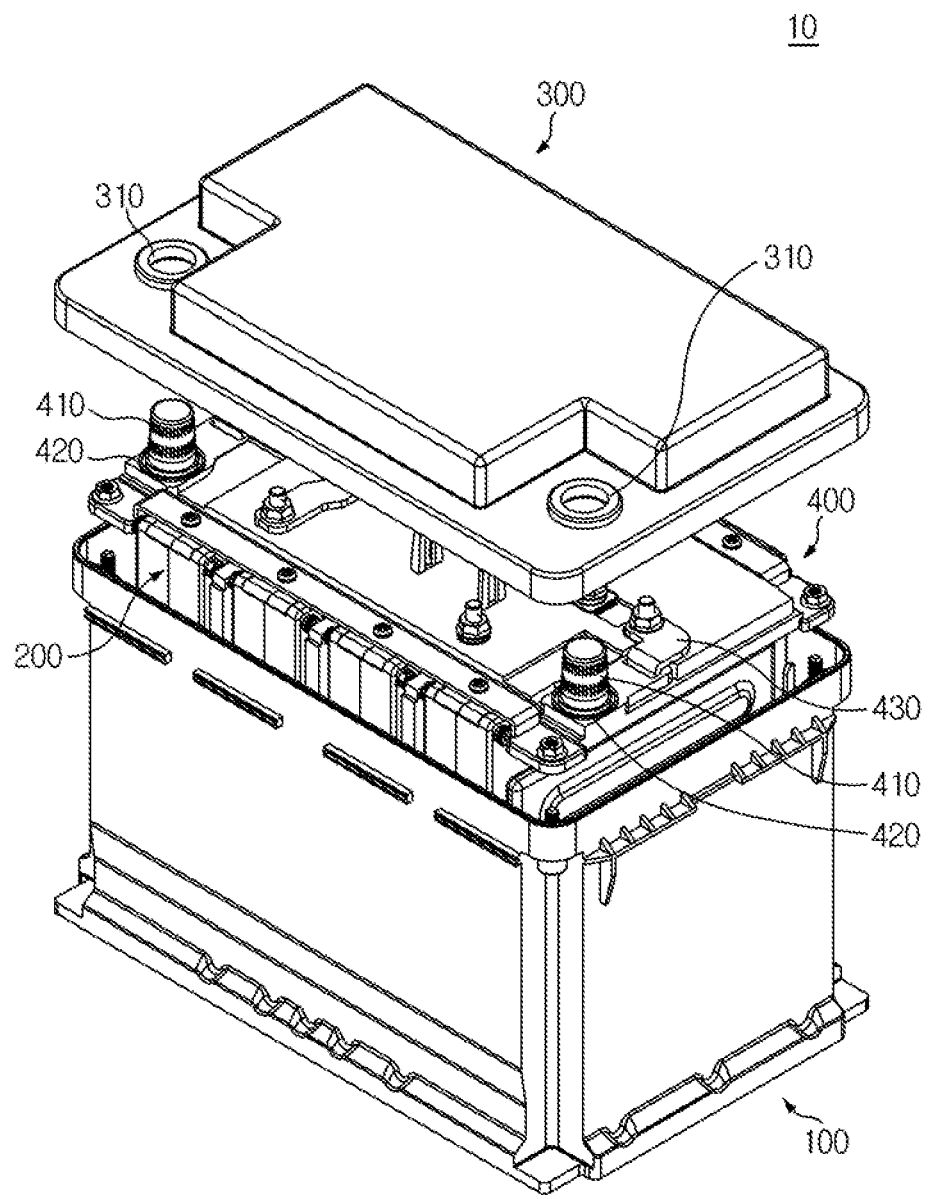
FIG. 1 is a diagram of a battery pack according to an embodiment of the present disclosure.
Figure 2:
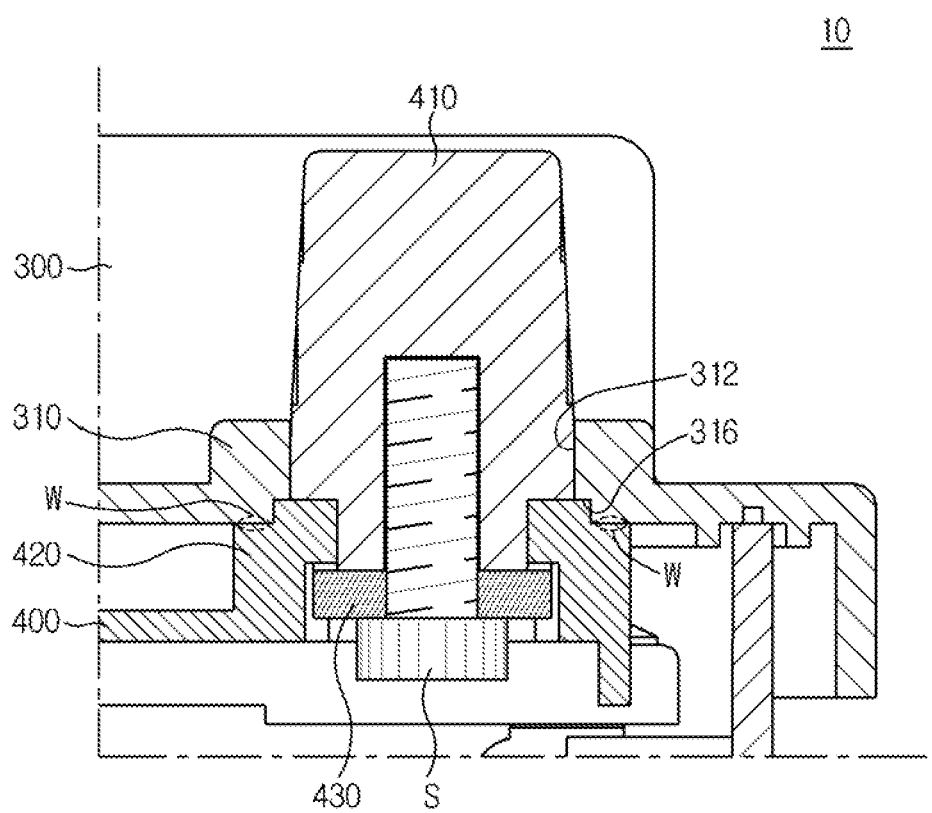
FIGS. 2 and 3 are partially cross-sectional views of main parts in the battery pack of FIG. 1.
Figure 3:
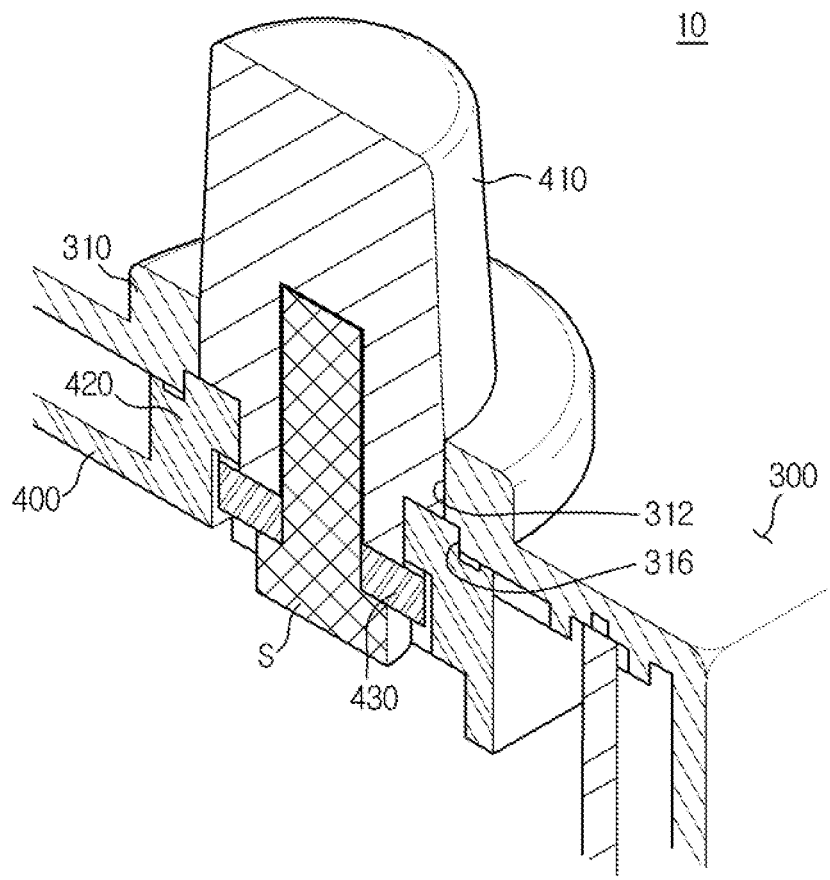

FIG. 1 is a diagram of a battery pack according to an embodiment of the present disclosure, and FIGS. 2 and 3 are partially cross-sectional views showing main parts of the battery pack of FIG. 1.

Referring to FIGS. 1 to 3, a battery pack 10 includes a pack case 100, a cell assembly 200, a pack cover 300, and a lead connecting substrate 400.

The pack case 100 may establish an exterior of the battery pack 10. The pack case 100 may include an accommodation space for accommodating the cell assembly 200.

The cell assembly 200 is accommodated in the pack case 100, and may be provided as a module assembly including a plurality of battery cells. Each of the battery cells may include an electrode assembly including a cathode plate and an anode plate that are arranged as a separator is disposed between the cathode plate and the anode plate, a battery case for sealing and accommodating the electrode assembly with an electrolyte, and an electrode lead protruding out of the battery case and including a cathode terminal and an anode terminal. Each of the plurality of battery cells is mounted on a cartridge, etc., to be connected to the others to form the cell assembly 200.

The pack cover 300 may cover a side of the pack case 100 so as to package the cell assembly 200. The pack cover 300 may be welded to the pack case 100 along with edges of the pack case 100 for packaging the cell assembly 200. Here, the welding is performed by a laser welding process. The welding method is not limited to the laser welding method, and other different welding methods may be used. Also, the pack cover 300 may be mounted on the pack case 100 in other manners than the welding operation, provided that the battery pack may be packaged.

The pack cover 300 may include terminal through units 310.

The terminal through units 310 are provided to allow terminals 410 that will be described later to penetrate therethrough and to be exposed to an outer portion of the pack cover 300, and the number of the terminal through units 310 may correspond to the number of the terminals 410. Since a pair of the terminals 410 are provided, a pair of terminal through units 310 may be provided to correspond to the terminals 410. The pair of the terminal through units 310 may be disposed respectively in a side and the other side of the pack cover 300.

The terminal through units 310 may each include a first internal wall 312 and a second internal wall 316.

The first internal wall 312 may have a hollow shape to contact an external surface of the terminal 410 penetrating through the terminal through unit 310. Here, the first internal wall 312 is formed to have an inner diameter corresponding to an outer diameter of the terminal 410 so as to tightly contacting the external surface of the terminal 410.

Accordingly, the terminal through unit 310 may primarily block the infiltration of the moisture or impurities from the external portion of the pack cover 300 by using the first internal wall 312 tightly contacting the external surface of the terminal 410.

The second internal wall 316 extends from the first internal wall 312 to be stepped so as to have an inner diameter that is greater than that of the first internal wall 312, and may contact a terminal insert unit 420 that will be described later.

The lead connecting substrate 400 connects the electrode leads of the battery cells in the cell assembly 200 to one another, and is provided between the cell assembly 200 and the pack cover 300 to be packaged in the pack case 100 with the cell assembly 200 by the pack cover 300.

The terminals 410 penetrating through the pack cover 300 to the external portion in order to be connected to an external power supply may be insert-molded on the lead connecting substrate 400. In addition, the lead connecting substrate 400 may include terminal insert units 420 and bus bars 430.

The terminals 410 may be provided as a pair, and may be insert-molded on the lead connecting substrate 400. Then, the terminals 410 may penetrate through the terminal through units 310 in the pack cover 300 to be exposed to outer portion of the pack cover 300 and may be electrically connected to the external power supply, etc.

The terminals 410 are insert-molded in the terminal insert units 420, the number of which may correspond to the number of the terminals 410. Since the pair of terminals 410 are provided, the terminal insert units 420 may be also provided as a pair.

In addition, since the terminals 410 that are insert-molded have to penetrate through the terminal through units 310, the pair of the terminal insert units 420 may be disposed respectively in a side and the other side of the lead connecting substrate 400 to correspond to the pair of terminal through units 310.

In the present embodiment, since the terminals 410 are insert-molded through the terminal insert units 420, the terminals 410 may be firmly and stably mounted on the lead connecting substrate 400.

In addition, the terminals 410 and the terminal insert units 410 may be sealed without generating a gap through the insert-molding, and thus, infiltration of the moisture or impurities into the cell assembly 200 that is provided under the lead connecting substrate 400 may be effectively prevented without using an additional sealing member for a waterproof function.

In addition, each of the terminal insert units 420 may be installed so that a side thereof facing the terminal through unit 310 may be engaged with the second internal wall 316 of the terminal through unit 310. To do this, an outer diameter of the terminal insert unit 420 at the side facing the terminal through unit 310 may correspond to the inner diameter of the second internal wall 316. That is, a width of an outer circumference of the terminal insert unit 420 may be greater than that of the terminal 410.

Accordingly, even if the moisture or impurities are infiltrated through the first internal wall 312 of the terminal through unit 310, the terminal insert unit 420 may additionally prevent the infiltration of the moisture or impurities at the portion engaged with the second internal wall 316.

Also, the terminal insert unit 420 may be connected to the terminal through unit 310 of the pack cover 300 via welding. Here, the welding between the terminal insert unit 420 and the terminal through unit 310 may be performed by a laser welding process. Through the laser welding process, the terminal insert unit 420 may be firmly mounted on the terminal through unit 310, and moreover, a sealing effect for preventing infiltration of the moisture or impurities may be improved.

The bus bars 430 electrically connects the electrode leads of the battery cells to one another, and electrically connects the electrode leads of the battery cells to the terminals 410. To do this, a plurality of bus bars 430 may be provided on the lead connecting substrate 400.

From among the plurality of bus bars, the bus bars 430 connecting the electrode leads of the battery cells to the terminals 410 are provided as a pair because the pair of terminals 410 are provided according to the present embodiment. Hereinafter, it will be described under an assumption that the bus bars represented by the reference numeral 430 denote the bus bars 430 connecting the electrode leads to the terminals 410.

The bus bars 430 may be connected to the terminals 410 in the terminal insert units 420. Here, the bus bar 430 and the terminal 410 may be connected to each other via a screw member S including a conductive material.

Through the above structure, the battery pack 10 according to the present embodiment may effectively achieve a waterproof function capable of preventing the moisture infiltration without using an additional sealing member.

Therefore, since the battery pack 10 according to the present embodiment does not require an additional sealing member for the waterproof function, additional costs do not arise, and manufacturing efficiency may be improved.

Figure 4:
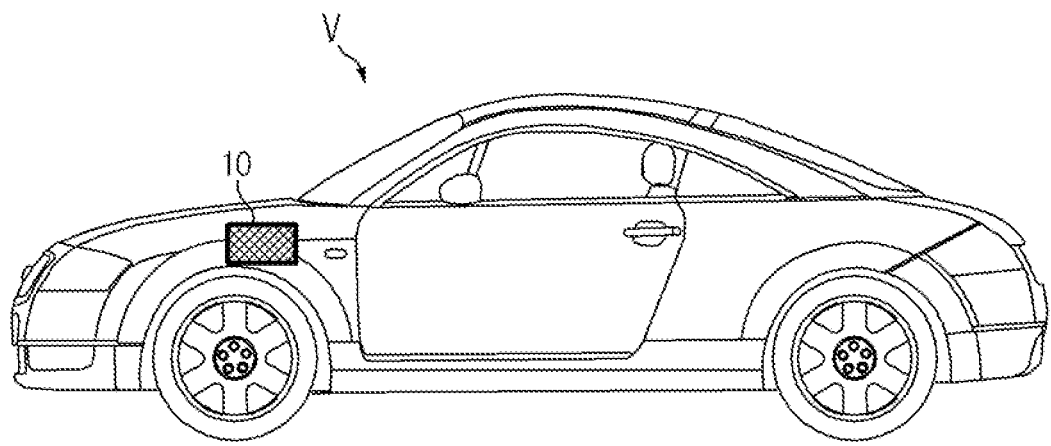
FIG. 4 is a diagram of a vehicle including the battery pack of FIG. 1.

FIG. 4 is a diagram of a vehicle including the battery pack of FIG. 1.

Referring to FIG. 4, a vehicle V may include the battery pack 10 according to the above-described embodiment. Here, the vehicle V including the battery pack 10 may be an electric car or a hybrid vehicle. In addition, the present disclosure may be applied to other types of vehicles, provided that the battery pack 10 may be used as a driving power source.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery pack comprising:
   a pack case configured to form an exterior;
   a cell assembly accommodated in the pack case, and comprising a plurality of battery cells, each battery cell including electrode leads;
   a pack cover configured to cover the pack case so as to package the cell assembly; and
   a lead connecting substrate provided between the cell assembly and the pack cover, configured to connect the electrode leads of the plurality of battery cells to one another, the lead connecting substrate including insert-molded terminals thereon, the terminals penetrating through the pack cover to be connected to an external power supply,
   wherein the pack cover comprises terminal through units, through which the terminals penetrate, and the lead connecting substrate comprises terminal insert units welded to the terminal through units, and
   wherein each of the terminal through units comprises:
      a first internal wall having a hollow shape contacting an external surface of each of the terminals; and
      a second internal wall extending from the first internal wall to be stepped, and configured to contact each of the terminal insert units.

2. The battery pack of claim 1, wherein the terminal insert unit is engaged with the second internal wall.

3. The battery pack of claim 1, wherein a width of an outer circumference of the terminal insert unit is greater than a width of an outer circumference of the terminal.

4. The battery pack of claim 1, wherein the terminal through unit and the terminal insert unit are welded with each other through a laser welding process.

5. The battery pack of claim 1, wherein the terminal through units are respectively provided in a side and other side of the pack cover, and the terminal insert units are respectively provided in a side and other side of the lead connecting substrate to correspond to the terminal through units.

6. The battery pack of claim 1, wherein the lead connecting substrate further comprises bus bars configured to electrically connect the electrode leads to the terminals, and the bus bars are connected to the terminals in the terminal insert units.

7. The battery pack of claim 1, wherein the pack cover is laser-welded to the pack case along with edges.

8. A vehicle comprising the battery pack according to claim 1.

* * * * *